(12) United States Patent
Stefanski et al.

(10) Patent No.: US 8,813,861 B2
(45) Date of Patent: Aug. 26, 2014

(54) FLAP AND ROLL POSITIONER FOR A SOD HARVESTING APPARATUS

(71) Applicants: Peter Stefanski, Pefferlaw (CA); Robert Milwain, Keswick (CA)

(72) Inventors: Peter Stefanski, Pefferlaw (CA); Robert Milwain, Keswick (CA)

(73) Assignee: 1093929 Ontario Limited, Keswick, Ontario (CA)

( * ) Notice: Subject to any disclaimer, the term of this patent is extended or adjusted under 35 U.S.C. 154(b) by 0 days.

(21) Appl. No.: 13/675,225

(22) Filed: Nov. 13, 2012

(65) Prior Publication Data

US 2014/0131057 A1    May 15, 2014

(51) Int. Cl.
*A01B 45/04*    (2006.01)

(52) U.S. Cl.
USPC ........................................................... 172/19

(58) Field of Classification Search
USPC ...................................................... 172/19, 20
See application file for complete search history.

(56) References Cited

U.S. PATENT DOCUMENTS

| | | | | |
|---|---|---|---|---|
| 3,053,328 | A | * | 9/1962 | Geipel ............................ 172/19 |
| 3,366,081 | A | * | 1/1968 | Geiss ............................ 111/200 |
| 3,509,944 | A | | 5/1970 | Brouwer et al. |
| 4,142,691 | A | * | 3/1979 | Watton ........................ 242/541.2 |
| 4,832,130 | A | | 5/1989 | Brouwer et al. |
| 4,890,801 | A | * | 1/1990 | Brouwer et al. ................. 83/861 |
| 4,966,239 | A | * | 10/1990 | Hutchison ........................ 172/20 |
| 5,165,617 | A | * | 11/1992 | van Vuuren ................. 242/535.1 |
| 5,230,602 | A | * | 7/1993 | Schouten ................... 414/789.7 |
| 6,364,027 | B1 | | 4/2002 | Tvetene et al. |
| 6,779,610 | B2 | | 8/2004 | Brouwer et al. |
| 6,783,318 | B2 | * | 8/2004 | Tvetene et al. ............ 414/789.7 |
| 7,021,584 | B2 | | 4/2006 | Hendriks et al. |
| 7,066,277 | B2 | | 6/2006 | Hendriks et al. |
| 7,070,004 | B2 | | 7/2006 | Hendriks et al. |
| 2005/0058527 | A1 | * | 3/2005 | Tvetene et al. ................ 414/111 |
| 2005/0274530 | A1 | | 12/2005 | Brouwer et al. |

FOREIGN PATENT DOCUMENTS

| | | |
|---|---|---|
| CA | 2283871 A1 | 7/2000 |
| CA | 2413622 A1 | 2/2004 |

OTHER PUBLICATIONS

International Search Report and Written Opinion in PCT/CA2013/050826, mailed Feb. 14, 2014.

\* cited by examiner

*Primary Examiner* — Thomas B Will
*Assistant Examiner* — Jessica H Lutz
(74) *Attorney, Agent, or Firm* — Bereskin & Parr LLP/S.E.N.C.R.L., s.r.l.

(57) ABSTRACT

A sod harvester may include a cutting head for cutting the strip of sod from a field, a transport conveyor located behind the cutting head for conveying the strip of sod from the cutting head, and a roll-up mechanism operatively connected to the transport conveyor. The roll-up mechanism may be adapted to form the strip of sod into the sod roll. An accumulator may be disposed downstream from the transport conveyor. The accumulator may include a receiving surface to receive the sod roll from the transport conveyor. A guide member may be positioned above the accumulator. The guide member may be adapted to contact an outer surface of the sod roll when the sod roll is transferred from the transport conveyor to the receiving surface, thereby inhibiting unrolling of the sod roll.

24 Claims, 8 Drawing Sheets

FLAP AND ROLL POSITIONER FOR A SOD HARVESTING APPARATUS

FIELD

The Applicant's teachings described herein relate generally to a sod harvester configured to produce rolls of sod and to inhibit unwinding of the rolls of sod as the sod rolls are conveyed by the sod harvester. More specifically, the teachings described herein relate to a sod harvester having a flap and roll positioning mechanism to hold the flap of each sod roll in a desired position as the sod roll is conveyed in the sod harvester.

INTRODUCTION

U.S. Pat. No. 6,364,027 discloses a method of transferring a roll of sod while inhibiting unwinding of the roll of sod. The method comprising the steps of: (a) rolling a slab of sod into a first sod roll; (b) forcing the first sod roll onto a sod roll handling mechanism containing a second sod roll with the first sod roll forming pressure contact with the second sod roll on the sod roll handling mechanism; and (c) advancing the sod roll handling mechanism with the second sod roll while maintaining the first sod roll and the second sod roll in pressure contact to thereby inhibit the unwinding of the first sod roll as the first sod roll is transferred to the handling mechanism and a sod harvester guidance system for maintaining a full cut.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to one broad aspect of the teachings described herein, a sod harvester for harvesting a strip of sod from a field and forming the strip of sod into a sod roll may include a cutting head for cutting the strip of sod from the field, a transport conveyor located behind the cutting head for conveying the strip of sod from the cutting head, and a roll-up mechanism operatively connected to the transport conveyor. The roll-up mechanism may be adapted to form the strip of sod into the sod roll. An accumulator may be disposed downstream from the transport conveyor. The accumulator may include a receiving surface to receive the sod roll from the transport conveyor. A guide member may be positioned above the accumulator. The guide member may be adapted to contact an outer surface of the sod roll when the sod roll is transferred from the transport conveyor to the receiving surface, thereby inhibiting unrolling of the sod roll.

The guide member may be configured to inhibit unrolling by retaining an outer flap of the sod roll adjacent to a body of the sod roll while the sod roll moves from the transport conveyor to the accumulator.

The guide member may include an arm and a contact member. The contact member may be connected to a distal end of the arm. The guide member may be pivotably connected to the accumulator at a proximate end of the arm.

The guide member may be biased against the outer flap of the sod roll as the sod roll moves from the transport conveyor to the accumulator.

The guide member may be biased by a gravitational force acting on the guide member.

The guide member may be adapted to adjust a length of the arm.

The contact member may be a roller, and the roller may be a brush roller comprising a plurality of bristles. The bristles may be adapted to contact the sod roll while minimizing damage to the sod roll.

The roll-up mechanism may include a roll-up conveyor positioned above the transport conveyor. The roll-up conveyor may be configured to move in a direction opposite to the direction of the transport conveyor.

The roll-up mechanism may include a holding conveyor positioned substantially adjacent to the transport conveyor, wherein the transport conveyor and the roll-up conveyor define a pocket for maintaining the sod roll on the transport conveyor.

The accumulator may include a storage conveyor to convey the sod roll away from the transport conveyor and may be sized to transport a plurality of sod rolls.

The storage conveyor may be operable to convey a first sod roll away from the transport conveyor before a second sod roll is transferred from the transport conveyor to the receiving surface to provide a gap between the first and second sod rolls.

A sod stacker may be configured to transfer the sod roll from the accumulator to a storage location.

According to another broad aspect of the teachings described herein, a method of harvesting sod may include the steps of: cutting a plurality of strips of sod from the ground; conveying each strip of sod downstream along a transport conveyor and rolling each strip of sod into a sod roll having a body and an outer flap; and transferring the sod roll from the transport conveyor to a receiving surface of an accumulator. The accumulator may be located downstream from the transport conveyor. A guide member may engage the sod roll to retain the outer flap against the body when the sod roll is transferred from the transport conveyor to the receiving surface of the accumulator.

According to another broad aspect of the teachings described herein, a method of harvesting sod may include the steps of: cutting a plurality of strips of sod from the ground; conveying each strip of sod downstream along a transport conveyor; rolling each strip of sod into a plurality of sod rolls having a body and an outer flap; transferring a first sod roll from the transport conveyor to an accumulator; conveying the first sod roll away from the transport conveyor; and transferring a second adjacent sod roll from the transport conveyor to the accumulator. When the second sod roll is transferred to the accumulator, the second roll may not push against the first sod roll.

The first sod roll may be conveyed away from the transport conveyor by an index distance, whereby a gap is defined between the first sod roll and the second sod roll when the first and second sod rolls are located on the accumulator. The index distance may be greater than a diameter of the first sod roll.

The method may also include engaging each sod roll with a guide member to retain the outer flap against the body when the sod roll is transferred from the transport conveyor to a receiving surface of the accumulator.

The guide member may include a roller located at a distal end of the guide member, and the method further comprising rollingly contacting the sod roll to retain the outer flap against the body of the sod roll.

The method may include maintaining rolling engagement between the roller and the first sod roll as the sod roll is conveyed away from the transport conveyor.

The method may also include the sod roll pushing on the roller to raise the roller from a lowered position, in which the roller is spaced above the receiving surface by a first offset distance, to a raised position, in which the roller is spaced above the receiving surface by a second offset distance, wherein the second offset distance is greater than the first offset distance.

The method may include biasing the roller toward the lowered position.

DRAWINGS

Figure 1:
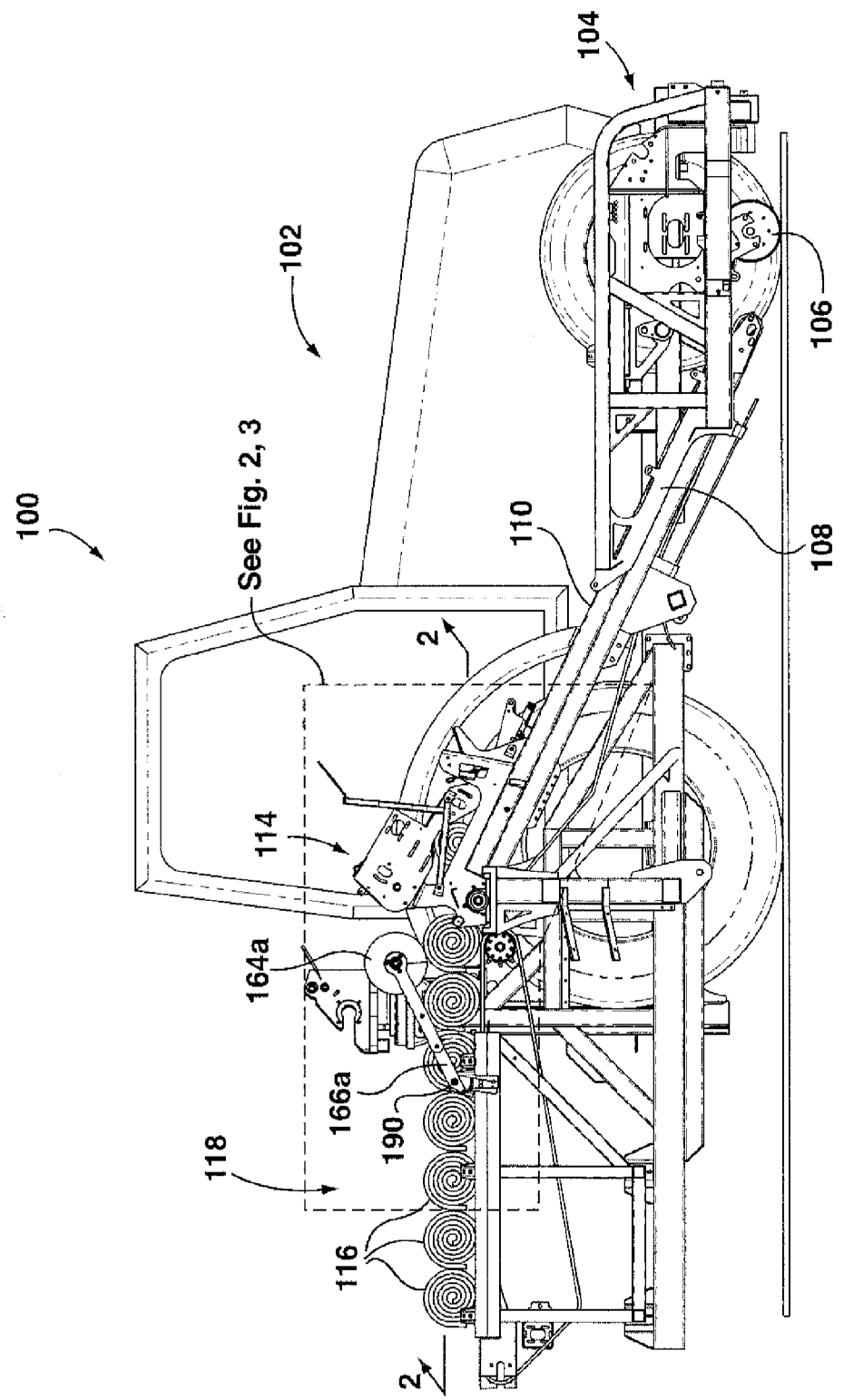
FIG. 1 is a side view of an example of portions of a sod harvester.

Reference numerals may be repeated amongst the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Reference is made to FIG. 1, which shows a simplified diagrammatic view of portions of a sod harvester 100. The sod harvester 100 is intended to be mounted to a supporting vehicle, a tractor 102 in the illustrated example, but alternatively may be towed by a towing vehicle or may be self-propelled. For example, sod harvesters may be attached to a tractor for propulsion, or may be self-propelled. One example of a typical prior art sod harvester is a sod harvester produced by Kesmac Inc. of Keswick, Ontario, Canada, for attachment to a tractor as shown in U.S. Pat. No. 6,779,610, incorporated herein by reference in its entirety. The exemplary embodiments described herein may also equally applicable to a self-propelled sod harvester, such as that shown in U.S. Pat. No. 4,966,239, incorporated herein by reference in its entirety, and/or to a towable sod harvester.

The sod harvester 100 is intended to cut strips of sod from the ground and to roll-up the strips of sod to produce sod rolls which can be stacked on a pallet, or other storage member.

The sod harvester 100 may include any suitable sod cutting apparatus, such as cutting head 104, which may include any suitable sod cutting components. Optionally, the cutting head 104 can include a ground roller 106 located behind a conventional cross cut blade. The cross cut blade may be driven downwardly at periodic intervals (by any suitable conventional mechanism) to form a transverse cut in the ground, so that the strip of sod which is to be cut by the cutting head 102 will be cut into individual slabs, each of which can be formed into a roll. The strip of sod to be cut travels beneath the roller 106 and is then undercut by a conventional undercutting knife, which includes side cutting blades, one at each side thereof. The undercutting knife can be mounted on arms which are reciprocated forwardly and rearwardly in conventional fashion by a hydraulic motor (not shown), to cut a strip of sod.

Figure 2:
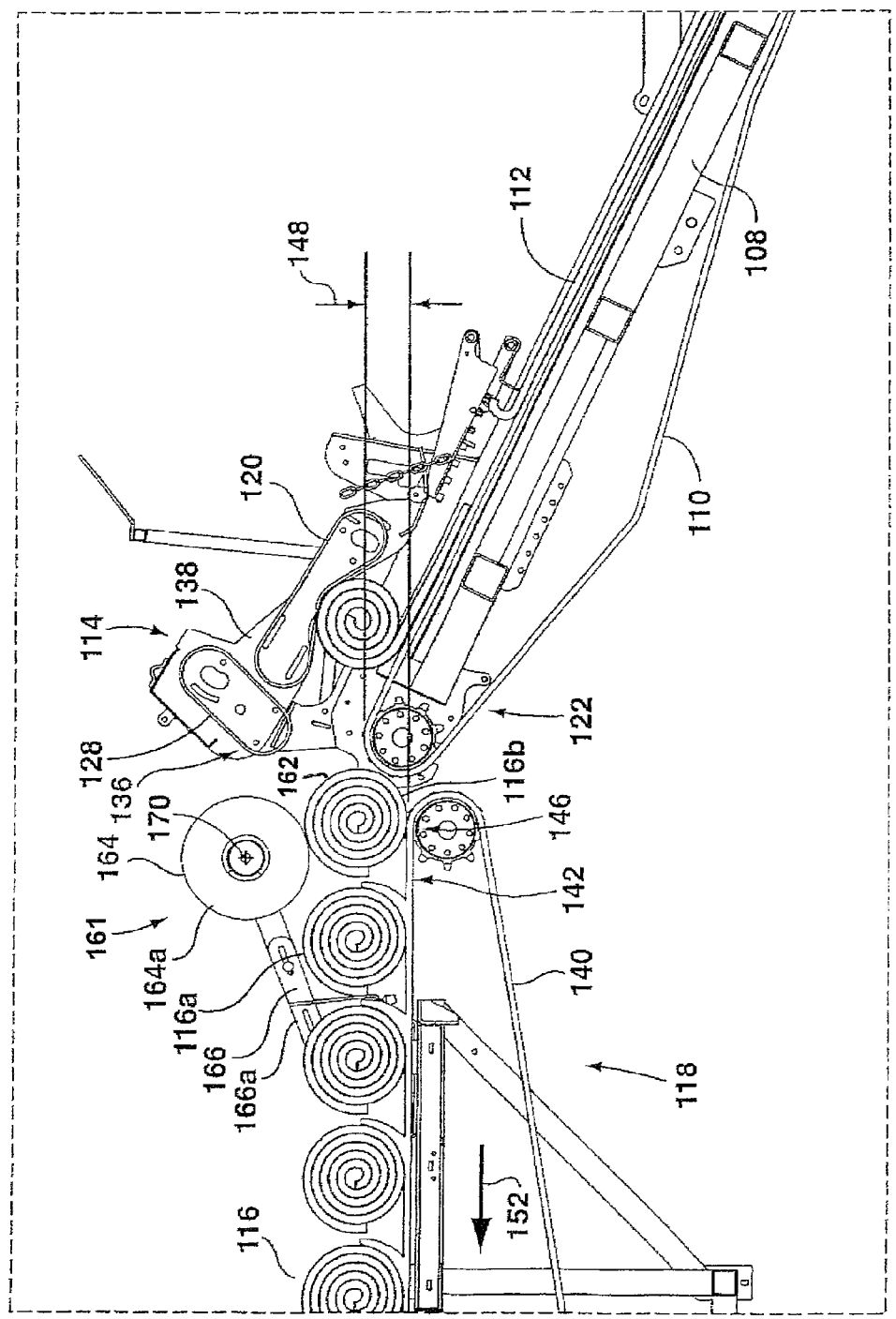
FIG. 2 is a section view of a portion of the sod harvester of FIG. 1, taken along line 2-2.

Optionally, the cutting head 104 can be mounted on a conveyor frame 108 which extends rearwardly from the cutting head 104. One or more transport conveyors can be mounted in the conveyor frame to carry cut sod slabs rearwardly and upwardly from the undercutting knife. Referring also to FIG. 2, in the illustrated example, a transport conveyor 110 is positioned to downstream from the cutting head 104 to receive the cut sod strips 112 and convey them away from the cutting head 104.

A sod roll-up mechanism 114 is provided to roll the sod strips 112 into sod rolls 116. After being formed into sod rolls 116, the rolls of sod 116 are transferred to an accumulator 118 disposed downstream from the transport conveyor 110. In the illustrated example, the roll-up mechanism 114 includes, a roll-up conveyor 120, a starter gate 124, a tray 126, and a holding conveyor 128.

Figure 3:
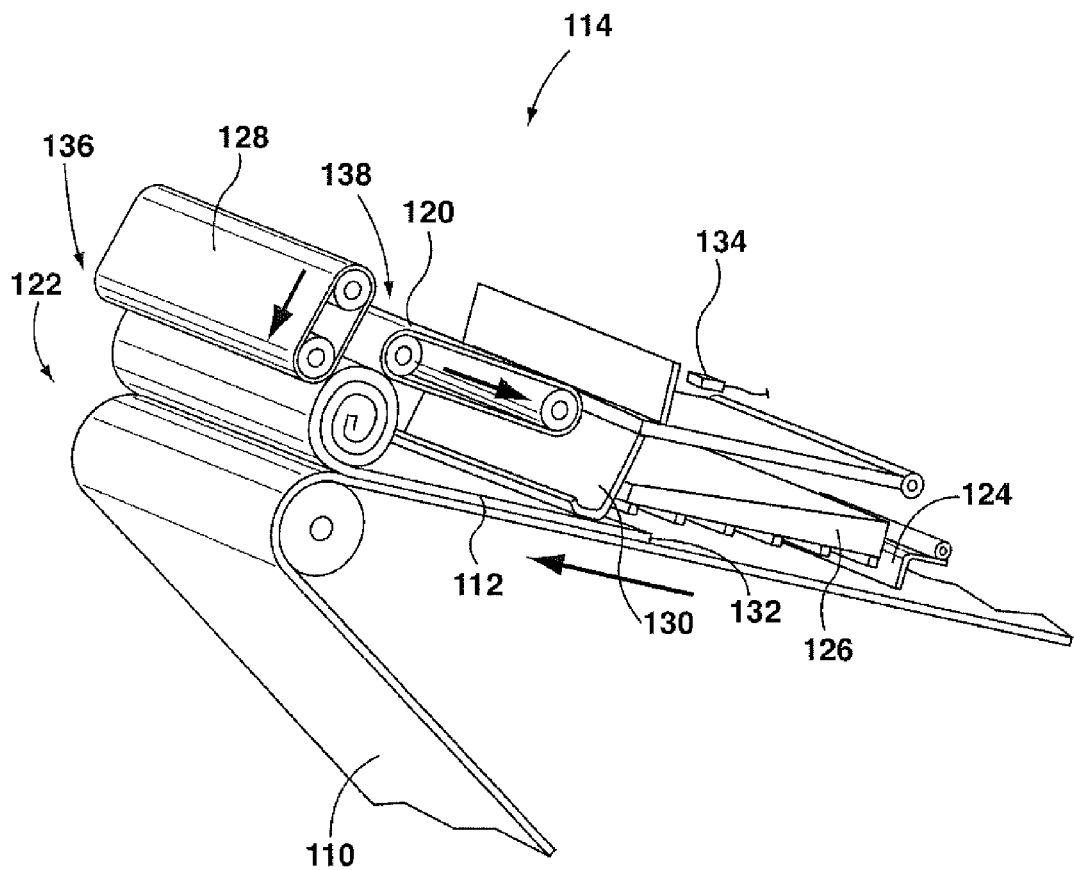
FIG. 3 is a perspective view of a portion of the sod harvester of FIG. 1.

Referring to FIG. 3, in the illustrated example, the roll-up conveyor 120, is located at the rear upper end 122 (downstream end) of the transport conveyor 110. Upstream from the roll-up conveyor 120, the sod roll 116 is started by catching and turning back the leading edge of a slab of sod on a curved piece of expanded metal, typically referred to as a starter gate 124. The sod continues to roll under a tray 126 that provides sufficient friction to hold the top of the newly started roll generally stationary as the transport conveyor 110 moves the sod rearward (to the left in FIG. 3). As the roll 116 moves rearward (downstream) and grows, it encounters the roll-up conveyor 120, which is located above the transport conveyor 110. Optionally, the roll-up conveyor 120 operates on a parallel plane but moves in a direction opposite and at a slightly slower speed than transport conveyor 110. This may facilitate the sod roll 116 to be rolled in a tighter roll than would be required if only a tray 126 were used.

Optionally, the roll-up mechanism may also include a device for sensing the end of the strip of sod, specifically a runner 130 that rides on sod strip 112. Once the trailing end 132 of sod strip 112 has passed the runner 130, runner 130 drops down to the level of the transport conveyor 110. A flange linked to runner activates a proximity switch 134. Although a proximity switch 134 is shown herein, other devices for sensing the end of the sod strip could include a mechanical micro-switch, various proximity sensors, or an optical sensor.

In the illustrated example, a third, holding conveyor 128 located at the rear end 122 of the roll-up conveyor 110 holds the sod roll 116 in the roll-up conveyor 120. Holding conveyor 128 is generally vertical and rotates in the same directions as roll-up conveyor 120, but at the same surface speed of transport conveyor 110. The lower end 136 of the holding conveyor 128 is located slightly lower than the rear end 138 of roll-up conveyor 120 (see also FIG. 2). The relative positioning of the conveyors 120 and 128 forms a slight pocket between the two conveyors, which holds sod roll 116. Optionally, a roller may be substituted for the holding conveyor 128.

The roll-up mechanism 114 ejects the sod rolls 116 from roll-up conveyor 120 based on the position of the end 132, which forms a flap 132a of the sod roll, as sensed by runner 130 (FIG. 3). The time delay from when the end 132 (FIG. 4) of the strip is sensed can be adjusted so that the end of the flap 132a is at a desired angular position about the roll at the moment when the roll is ejected from the roll-up conveyor 120. This configuration may help reduce variability in the angular position of the flap 132a of the sod rolls 116. Alternatively, any other suitable sod roll-up mechanism may be used.

Figure 4:
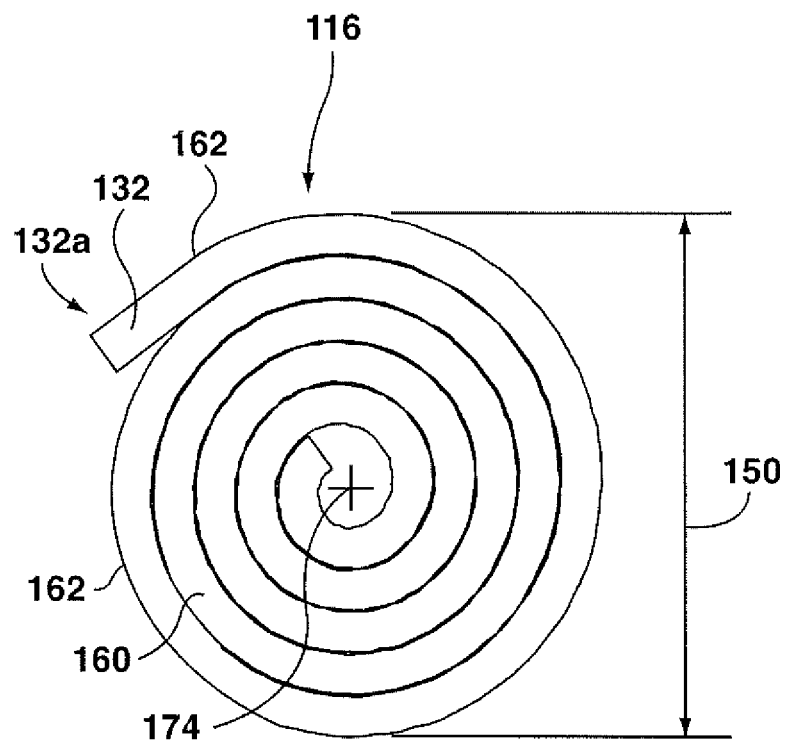
FIG. 4 is an end view of an example of a sod roll.

Referring to FIG. 4, if the flap 132a is located too far clockwise, when the sod roll 116 is ejected from the transport conveyor 110 it could fall down under the force of gravity, partially unrolling the roll of sod 116. If it is located too far counterclockwise, the flap 132a may hang down as it is picked up for stacking, which may be inconvenient. To help improve consistency in the sod handling process, it may be preferred that the flap 132a is located consistently to make the handling of the roll 116 more predictable. The flap location can be important when the roll of sod 116 will be handled mechanically, such as with a robotic sod stacker (not shown).

Referring to FIG. 2, in the illustrated example, the accumulator 118 includes a storage conveyor belt 140 having an upward facing receiving surface 142 upon which sod rolls 116 can be deposited in a group for subsequent processing, including, for example, transfer to a pallet 144 (FIG. 5) via a robotic sod stacker having a suitable sod clamp member. After being formed by the roll-up mechanism 114, sod rolls 116 are ejected from the downstream end 112 of the transport conveyor 110 and are received on a landing zone 146 on the accumulator. Preferably, the receiving surface 142 extends into, and forms the lower surface of the landing zone 146. In the illustrated example, the sod rolls 116 are delivered by the transport conveyor 110 to the accumulator.

In the illustrated example, the downstream end 122 of the transport conveyor 110 is at a higher elevation than the storage conveyor 140, and is spaced above the storage conveyor 140 by a vertical offset distance 148. The vertical offset distance 148 may be any suitable distance, and may be between about 1 inch and about 10 inches, or more. Optionally, the vertical offset distance 148 can be selected so that is less than the diameter 150 (FIG. 4) of the sod rolls 116 formed by the roll-up mechanism 114, and may optionally may be less than about 50% of the diameter 150.

In this configuration, sod rolls 116 ejected from the transport conveyor 110 can drop freely onto the accumulator 118 under the force of gravity, without being pushed or pressed by or against another sod roll. Transferring the rolls 116 from transport conveyor 110 to accumulator 118 using gravity may help eliminate the need for a transfer clamp or other type of mechanical transfer apparatus.

Referring to FIG. 2, in the illustrated example the storage conveyor 140 can be advanced or indexed, in the downstream direction indicated by arrow 152, after receiving each sod roll 116. Indexing the storage conveyor 140 enables a downstream sod roll, for example sod roll 116a, to be moved away from the landing zone 146 prior to sod roll 116b being deposited in the landing zone 146. In this configuration, the landing zone 146 can be cleared or emptied prior to receiving a subsequent sod roll 116 (see for example the empty landing zone 146 in FIG. 6).

Figure 5:
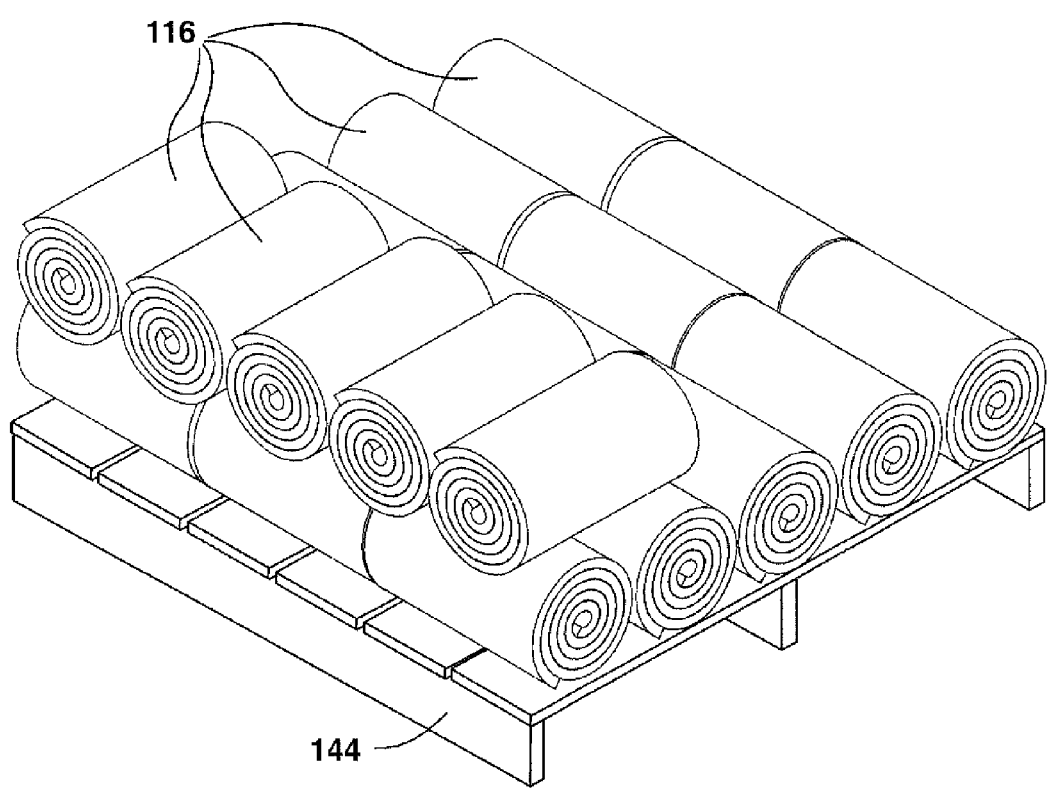
FIG. 5 is a perspective view of an example of sod rolls stacked on a pallet.

When a desired number of sod rolls 116 have been collected on the receiving surface 142, shown here as five rolls, they can be lifted and moved by a sod stacker (not shown) and stacked on any suitable storage member, such as pallet 144 as shown in FIG. 5.

Figure 6:
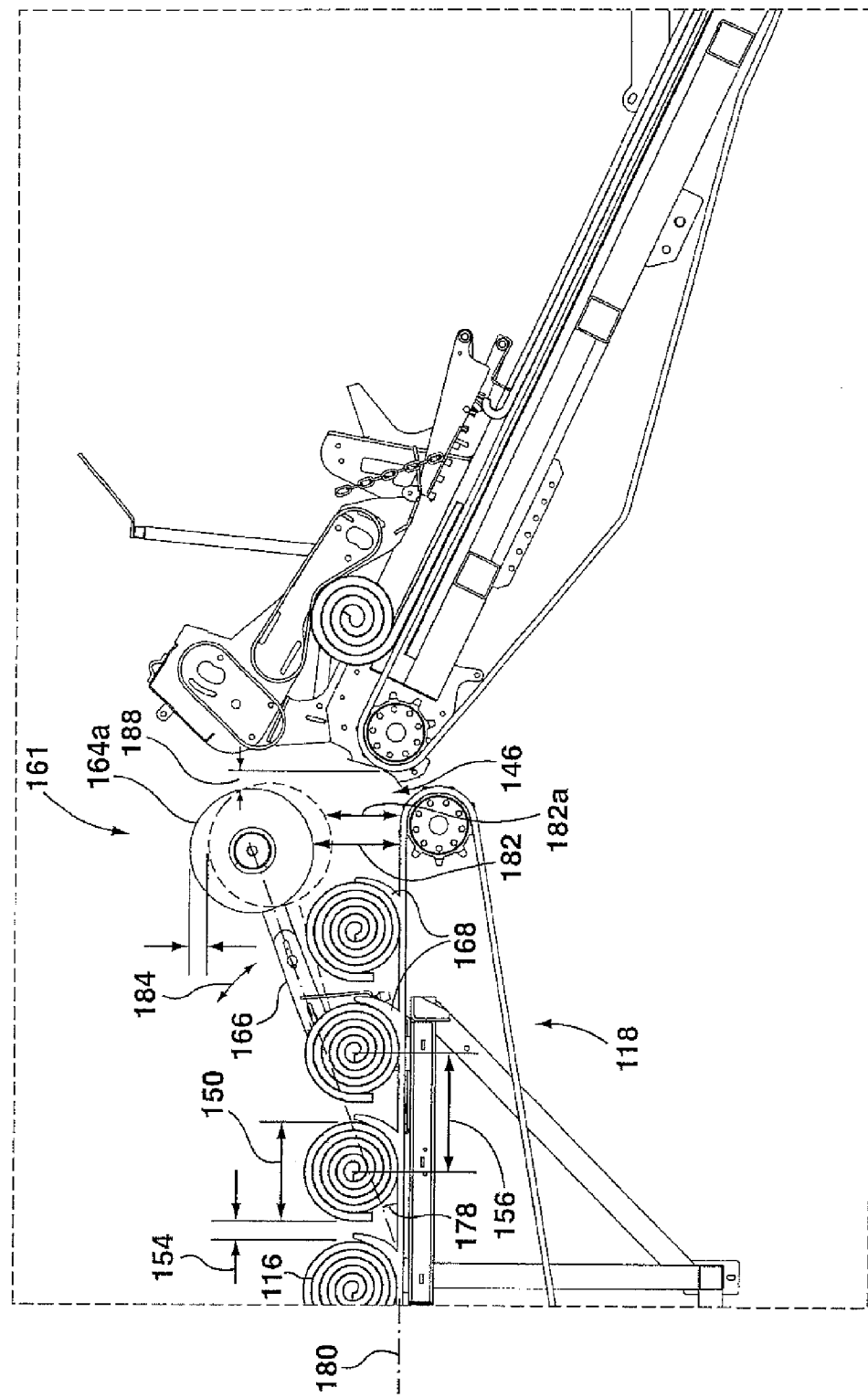
FIG. 6 is the section view of FIG. 2, showing an empty landing zone.
Figure 8:
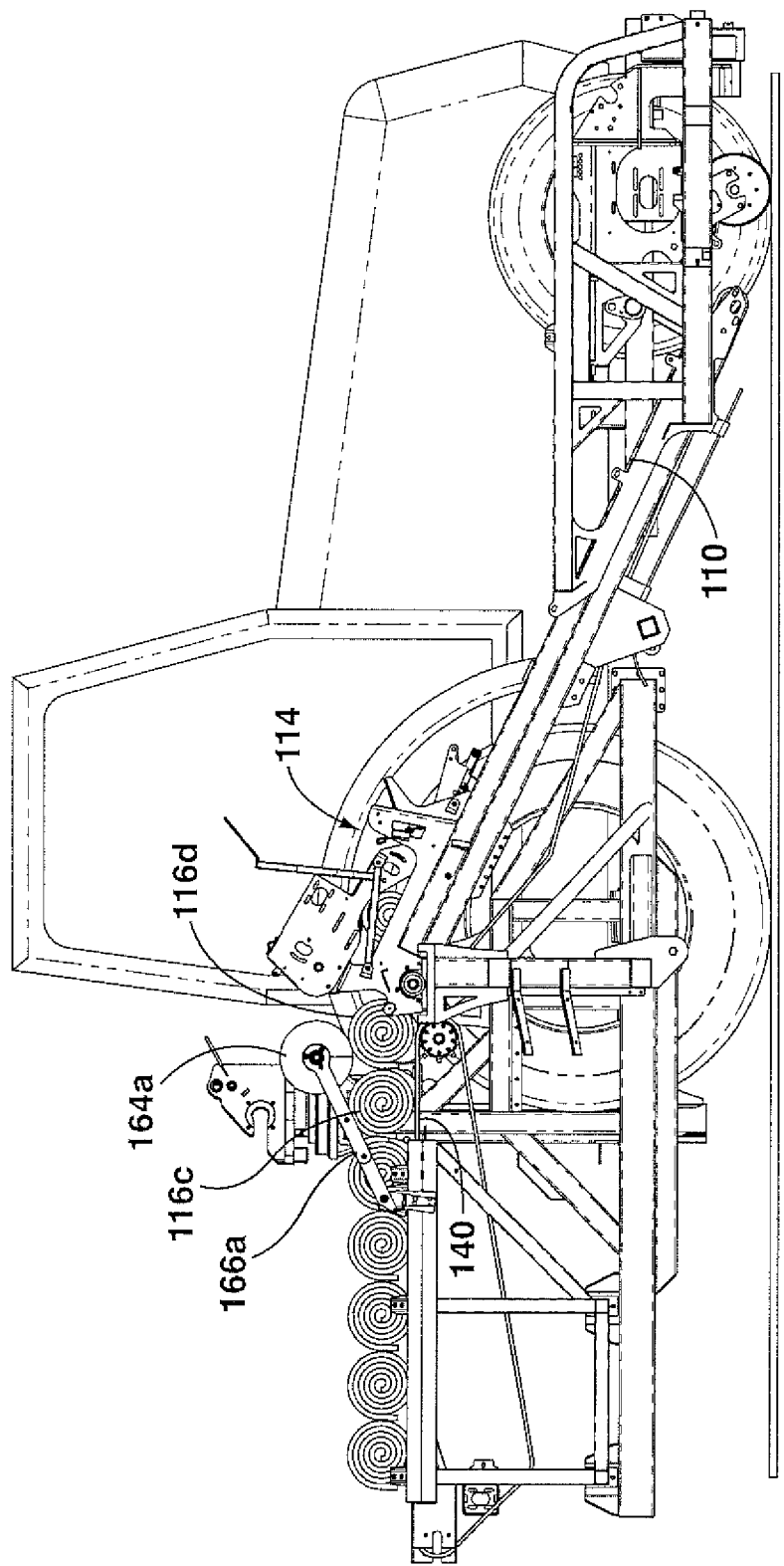
FIG. 8 is the side view of FIG. 1 showing sod rolls in contact with each other while resting on the accumulator.

Referring to FIG. 6, optionally, the storage conveyor 140 can be indexed after receiving each sod roll 116, so that a gap 154 can be provided between adjacent sod rolls 116. The size of the gap 154 can be selected by a user, and may be between about 0.1 inches and about 5 inches or greater than 5 inches. Alternatively, referring to FIG. 8, the storage conveyor 140 can be operated so that when a sod roll 116 falls from the transport conveyor 110 to the storage conveyor 140 it gently contacts or abuts an adjacent sod roll (e.g. the gap 154 is 0 inches). For example, the storage conveyor 140 can be operated so that the sod roll 116d falls from the transport conveyor 112 onto the storage conveyor 140 and may make contact with the outer surface of sod roll 116c. After contacting sod roll 116c, the sod roll 116d may remain in contact with sod roll 116c or may roll back slightly (e.g. away from sod roll 116c) to provide a small gap 154 as described above. In the illustrated examples the adjacent sod rolls need not be pressed or squeezed together on the storage conveyor 140, or during the transition from the transport conveyor 112 to the storage conveyor 140, to hold their flaps 132a in place, but may incidentally contact each other.

In contrast, if the storage conveyor 140 were not indexed between receipt of successive sod rolls 116, when a sod roll 116 reached the accumulator it may be pressed against another sod roll 116 that is already resting on the receiving surface 142. When adjacent sod rolls 116 are pressed together it may be difficult to subsequently grasp or handle to remove any give sod roll 116 on the accumulator 118, since it abuts tightly with at least one adjacent roll and may be sandwiched between two adjacent rolls, one on each side. Having sod rolls 116 sandwiched together in tight, pressure contact, can make it more difficult to grasp and stack or manipulate any specific sod roll for transport, inspection, ejection of spoiled or scrap rolls, or manipulation the sod rolls for other purposes.

In the illustrated example, the storage conveyor 142 can be advanced by an index distance 156 after receiving each sod roll 116. In this configuration, adjacent sod rolls 116 resting on the storage conveyor 140 can be separated by the index distance 156 (represented as the centre-to-centre distance between adjacent sod rolls 116). Preferably, the index distance 156 is larger than the diameter 150 of the sod rolls to provide the desired gaps 154 between adjacent sod rolls 116. Alternatively, the storage conveyor 140 can be operated so that adjacent sod rolls 116 are in contact with each other, e.g. the index distance 156 is generally equal to or less than the diameter of a sod roll 150.

Absent contact with an adjacent sod roll, when a sod roll is ejected from the transport conveyor and falls onto the landing zone the sod roll may tend to unwind or unravel as it falls. For example, when the sod roll falls from the transport conveyor, the outer flap 132a on the sod roll 116 may tend to separate from the body 160 of the sod roll 116 (FIG. 4). Maintaining the sod rolls 116 in their tight, rolled configuration may allow for easier handling and/or better stacking of the sod rolls 116 and/or for more compact stacking or transport of the sod rolls 116.

Optionally, the sod harvester 110 can include one or more guide members positioned above the accumulator 118 to contact an outer surface 162 of the sod roll 116 when the sod roll 116 is transferred from the transport conveyor 110 to the receiving surface 142 to help inhibit unrolling of the sod roll 116. Preferably, the guide member will include at least one contact member for engaging the sod rolls, and at least one support member for positioning the contact member in a desired location relative to the accumulator 118 and transport conveyor 110. Optionally, the contact member may be moveable relative to the accumulator 118 and/or the transport conveyor 110 to help accommodate incoming sod rolls 116.

Referring to FIG. 2, in the illustrated example, the sod harvester 100 includes a guide member in the form of a sod flap and roll positioner 161. In this example, the guide member 161 includes a contact member 164 that is configured to engage sod rolls 116 entering the landing zone 146, and a support member 166 supporting the contact member above the accumulator 118. Preferably, the guide member 161 is configured so that the contact member 164 is positioned generally adjacent the downstream end 122 of the transport conveyor 110 so that the contact member 164 can engage sod rolls 116 as they fall from the transport conveyor 110 onto the receiving surface 142. Engaging the sod rolls 116 as they fall from the transport conveyor 110 may help reduce the likelihood that the sod rolls 116 will unwind as they fall.

Optionally, the contact member 164 may also be positioned to engage the sod roll 116 while the accumulator storage conveyor 140 is moving, and may be configured to help hold the sod roll 116 in place as it is being indexed/conveyed downstream. This may help prevent the sod roll 116 from moving or slipping relative to the accumulator storage conveyor 140. Optionally, the accumulator storage conveyor 140 may also include one or more uprights or retaining members 168 (FIG. 6) protruding from the receiving surface 142 to help control lateral movement of the sod rolls 116 relative to the storage conveyor 140.

Referring to FIG. 2, the guide member 161 is configured to inhibit unrolling or unwinding of the sod rolls 116 by engaging and holding the outer flap 132a of the sod roll adjacent the body 160 of the sod roll while the sod roll 116 moves from the transport conveyor 110 to the accumulator 118. In the illustrated example, the contact member 164 includes a roller 164a and the support member 166 includes two support arms 166a supporting the roller. Alternatively, the support member may include one support arm or more than two support arms.

Figure 7:
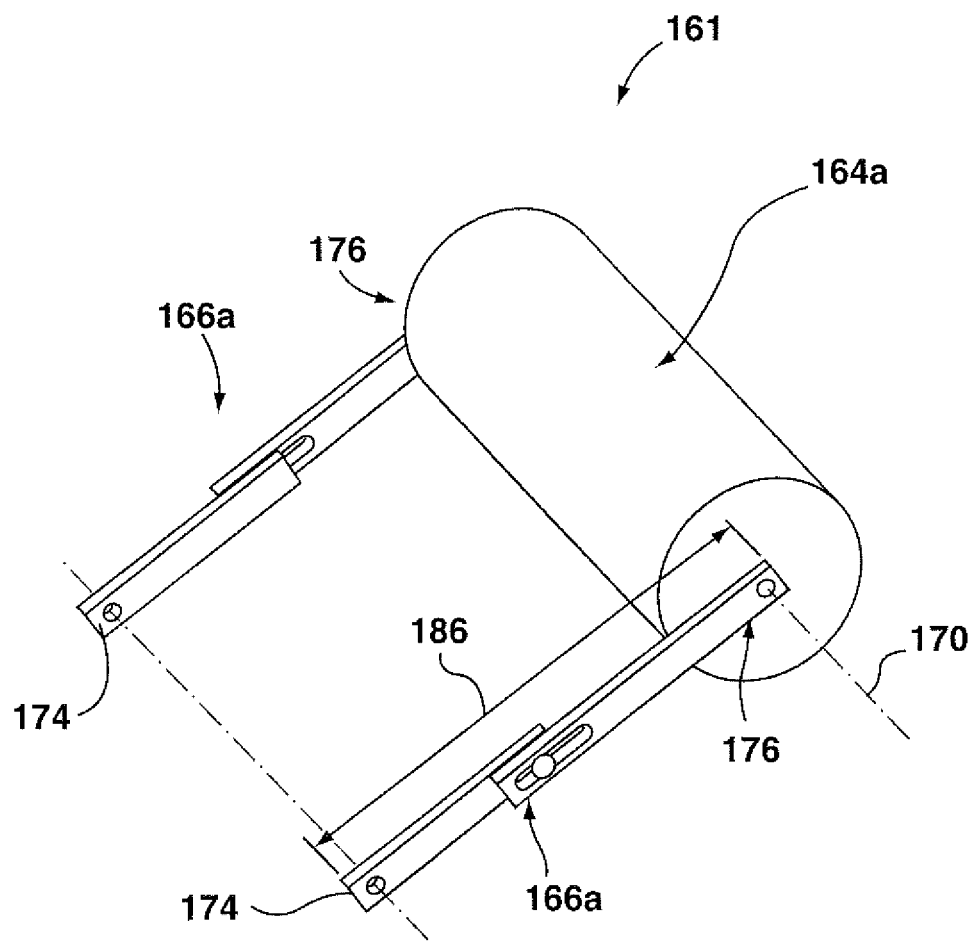
FIG. 7 is a perspective view of a portion of the sod harvester of FIG. 1.

Referring to FIG. 7, the roller 164a is configured to rotate about a roller axis 170 (represented as "x" 170 in FIG. 2). In the illustrated example, the roller axis 170 is generally perpendicular to the direction of travel of the transport conveyor 110 and the accumulator storage conveyor 140, and is generally parallel to the longitudinal axis (represented as "x" 172 in FIG. 4) of the sod rolls 116 travelling on the conveyors 110 and 140. Alternatively, the roller axis 170 may be in a different orientation.

In the illustrated example, the support arms 166a connect the roller 164a to the frame of the sod harvester 100. In this configuration, a first or proximate end 174 of each support arm 166a is connected to the accumulator portion 118 of the sod harvester 100, and the roller 164a is rotatably supported toward the second or distal ends 176 of the support arms 166a. Referring to FIG. 6, in the illustrated example the support arms 166a are inclined at an angle 178, relative to a horizontal plane 180 containing the receiving surface 142. In this configuration, the proximate ends 174 of the support arms are downstream or behind the distal ends 176 of the support arms, relative to the direction of travel of the sod harvester 100 and the direction of conveyance of the sod rolls 116.

Referring to FIG. 6, the roller 164a is spaced above the receiving surface by a roller spacing distance 182. Optionally, the support arms 166a can be moveably coupled to the sod harvester 100 so that the roller spacing distance 182 can be changed while the sod harvester is in use. For example, the support arms 166a may be pivotally coupled to the accumulator 118, for example using a pin connection 190 (FIG. 1) or other suitable joint, so that the roller 164a can move between a raised position (shown in solid FIG. 6) having a roller spacing distance 182, and a lowered position (shown in dashed lines in FIG. 6) having a smaller roller spacing distance 182a.

Optionally, the movement of the support arms 166a, in the direction illustrated by arrows 184, can be limited using a stop or other suitable member. For example, the support arms 166a can be limited so that when the roller 164a is in the lowered position the roller spacing distance 182a is less than the diameter 150 of the sod rolls 116. In this configuration, the roller 164a will be in a position to contact the outer surface 162 of the sod roll 116 as it is received on the accumulator 118. As the sod roll 116 is conveyed downstream, contact between the roller 164a and the surface 162 of the sod roll 116 may urge the roller 164a upward, toward its raised position. In the illustrated embodiment the roller 164a remains in rolling contact with the surface of the sod roll 116, and can be lifted into its raised position as the sod roll 116 passes beneath the roller 164a. In this configuration, the roller spacing distance 182 when the roller 164a is in its raised position may be generally the same as, and/or greater than the diameter 150 of the sod roll 116.

Optionally, the support arms 166a may be biased toward lowered position, by gravity (as illustrated) and/or by any suitable biasing member (not shown), so that the roller 164a will return to its lowered position absent contact with a sod roll 116. In the illustrated example, gravity biases the roller 164a downward and helps maintain rolling contact with the outer surface 162 of the sod rolls 162. Gravity can also keep the roller 164a in contact with the outer surface 162 of the sod roll 116 as the sod roll 116 moves along the accumulator. This may help keep the sod flap 132a in close proximity to the body 160 of the sod roll 116 while the sod roll 116 is being conveyed.

Alternatively, or in addition to, the support arms 166a being movably connected to the accumulator 118, the support arms 166a may be of adjustable length 186 (FIG. 7). Providing support arms 166a of adjustable or variable length 186 may help facilitate positioning of the roller 164a in the direction of travel of the sod harvester 100. This may help facilitate adjusting the lateral spacing 188 between roller 164a and the transport conveyor 110. Adjusting the lateral spacing 188 between the roller 164a and the conveyor 110 may help facilitate positioning of the roller 164a to engage sod rolls 116 of different diameters being ejected from the transport conveyor 110. The lateral spacing may be between about 2 inches and about 24 inches, or more. In the illustrated example, the support arms 166a are slidably adjustable and can be secured in a plurality of positions to adjust the length 186 of the support arms. Alternatively, the support arms 166a need not be slidably adjustable, but can be otherwise adjustable or a variety of support arms having different lengths could be used interchangeably.

In the illustrated example, the contact member 164 is a roller 164a that is configured to rollingly contact the surface 162 of the sod rolls 116. Typically, the outer surface 162 of the sod rolls 116 is formed from soil and is relatively fragile. It is desirable that the guide member be configured to prevent unrolling of the sod rolls, for example by holding the flap 132a in place, while minimizing damage to the sod rolls 116. Providing rolling contact between the guide member and the sod roll 116 may help minimize damage to the surface 162 of the sod roll 116, for example when compared to a static guide surface. Alternatively, instead of a roller 164a the guide member 161 may include a stationary guide plate or surface to help direct the sod rolls.

Optionally, while represented schematically as a solid roller, the roller 164a can be a brush roller having a plurality of bristles. The plurality of bristles may be able to deflect and/or bend to help accommodate for variations in the surface 162 of the sod roll 116, while still allowing the brush roller to hold the sod flap 132a in place. The stiffness of the bristles can be selected so that the brush roller can exert an adequate retaining force on the sod flap 132a while minimizing damage to the sod surface 162. Alternatively, the roller 164a could be any other type of roller suitable for engaging the outer surface of a sod roll, including, for example, a metal or plastic roller, a rubber roller, a roller with resilient or rubberized fingers, an open roller, a sponge roller and a foam roller.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A sod harvester for harvesting a strip of sod from a field and forming the strip of sod into a sod roll, the harvester comprising:
    a) a cutting head for cutting the strip of sod from the field;
    b) a transport conveyor located behind the cutting head for conveying the strip of sod from the cutting head;
    c) a roll-up mechanism operatively connected to the transport conveyor, wherein the roll-up mechanism is adapted to contact the strip of sod when the strip of sod is on the transport conveyor and to form the strip of sod into a completed sod roll;
    d) an accumulator disposed downstream from the transport conveyor, the accumulator comprising a receiving surface to receive the sod roll from the transport conveyor;
    e) a guide member spaced apart from and downstream of the roll-up mechanism and positioned above the accumulator to contact an outer surface of the sod roll when the sod roll is on the receiving surface of the accumulator, wherein the guide member comprises a roller positioned to rollingly contact the outer surface of the completed sod roll when the sod roll exits the roll-up mechanism and is transferred from the transport conveyor to the receiving surface, thereby inhibiting unrolling of the sod roll.

2. The sod harvester of claim 1, wherein the guide member is configured to inhibit unrolling by retaining an outer flap of the sod roll adjacent to a body of the sod roll while the sod roll moves from the transport conveyor to the accumulator.

3. The sod harvester of claim 2, wherein the guide member comprises an arm and, the roller is connected to a distal end of the arm, the guide member being pivotably connected to the accumulator at a proximate end of the arm.

4. The sod harvester of claim 3, wherein the guide member is biased against the outer flap of the sod roll as the sod roll moves from the transport conveyor to the accumulator by at least one of a gravitational force and a biasing member.

5. The sod harvester of claim 3, wherein the guide member is adapted to adjust a length of the arm.

6. The sod harvester of claim 1, wherein the roller is a brush roller comprising a plurality of bristles adapted to contact the sod roll while minimizing damage to the sod roll.

7. The sod harvester of claim 1, wherein the roll-up mechanism comprises a roll-up conveyor positioned above the transport conveyor, wherein the roll-up conveyor is configured to move in a direction opposite to the direction of the transport conveyor.

8. The sod harvester of claim 7, wherein the roll-up mechanism comprises a holding conveyor positioned substantially adjacent to the transport conveyor, wherein the transport conveyor and the roll-up conveyor define a pocket for maintaining the sod roll on the transport conveyor.

9. The sod harvester of claim 1, wherein the accumulator comprises a storage conveyor to convey the sod roll away from the transport conveyor and is sized to transport a plurality of sod rolls.

10. The sod harvester of claim 9, wherein the storage conveyor is operable to convey a first sod roll away from the transport conveyor before a second sod roll is transferred from the transport conveyor to the receiving surface to provide a gap between the first and second sod rolls.

11. The sod harvester of claim 1, further comprising a sod stacker configured to transfer the sod roll from the accumulator to a storage location.

12. A method of harvesting sod, the method comprising:
    a) cutting a plurality of strips of sod from the ground;
    b) conveying each strip of sod downstream along a transport conveyor;
    c) rolling each strip of sod into a sod roll using a roll-up mechanism, the sod roll comprising a body and an outer flap;
    d) ejecting the sod roll from the roll-up mechanism with the outer flap in a first position relative to the body and conveying the sod roll downstream from the roll-up mechanism;
    e) transferring the sod roll from the transport conveyor to a receiving surface of an accumulator, wherein the accumulator is located downstream from the transport conveyor, and
    f) engaging an outer surface of the sod roll with a guide member while the sod roll is on the receiving surface of the accumulator to retain the outer flap in the first position and inhibit unrolling of the sod roll.

13. The method of claim 12, further comprising transferring a second adjacent sod roll from the transport conveyor to the accumulator, wherein when the second sod roll is transferred to the accumulator, the second roll does not push against the first sod roll.

14. The method of claim 13, wherein the first sod roll is conveyed away from the transport conveyor by an index distance, whereby a gap is defined between the first sod roll and the second sod roll when the first and second sod rolls are located on the accumulator.

15. The method of claim 14, wherein, the index distance is greater than a diameter of the first sod roll.

16. The method of claim 12, wherein the guide member comprises a roller located at a distal end of the guide member, and the method further comprising rollingly contacting the sod roll to retain the outer flap against the body of the sod roll.

17. The method of claim 16, further comprising maintaining rolling engagement between the roller and the first sod roll as the sod roll is conveyed away from the transport conveyor.

18. The method of claim 17, further comprising the sod roll pushing on the roller to raise the roller from a lowered position, in which the roller is spaced above the receiving surface by a first offset distance, to a raised position, in which the roller is spaced above the receiving surface by a second offset distance, wherein the second offset distance is greater than the first offset distance.

19. The method of claim 18, further comprising biasing the roller toward the lowered position.

20. A sod harvester for harvesting a strip of sod from a field and forming the strip of sod into a sod roll, the harvester comprising:
    a) a cutting head for cutting the strip of sod from the field;

b) a transport conveyor located behind the cutting head for conveying the strip of sod from the cutting head;

c) a roll-up mechanism operatively connected to the transport conveyor, wherein the roll-up mechanism is adapted to form the strip of sod into a completed sod roll;

d) an accumulator disposed downstream from the transport conveyor, the accumulator comprising a receiving surface to receive the sod roll from the transport conveyor; and e) a guide member spaced apart from and downstream of the roll-up mechanism and positioned above the accumulator, the guide member comprising an arm and a contact member, the arm having a first end pivotally connected to the sod harvester and a second end spaced apart from the first end, the contact member coupled to the arm toward the second end and positioned to contact an outer surface of the sod roll when the sod roll is on the receiving surface of the accumulator to inhibit unrolling of the sod roll.

21. The sod harvester of claim 20, wherein the contact member is biased against outer surface of the completed sod roll as the sod roll moves from the transport conveyor to the accumulator by at least one of a gravitational force and a biasing member.

22. The sod harvester of claim 20, wherein the arm is adjustable between a first length and a different second length.

23. The sod harvester of claim 20, where the contact member comprises a roller to rollingly contact the outer surface of the completed sod roll.

24. The sod harvester of claim 23, wherein the roller is a brush roller comprising a plurality of bristles adapted to contact the sod roll while minimizing damage to the sod roll.

* * * * *

UNITED STATES PATENT AND TRADEMARK OFFICE
CERTIFICATE OF CORRECTION

| | | |
|---|---|---|
| PATENT NO. | : 8,813,861 B2 | Page 1 of 1 |
| APPLICATION NO. | : 13/675225 | |
| DATED | : August 26, 2014 | |
| INVENTOR(S) | : Peter Stefanski et al. | |

It is certified that error appears in the above-identified patent and that said Letters Patent is hereby corrected as shown below:

On the Title Page

Please amend item 73 as follows:

(At Assignee) replace "1093929 Ontario Limited" with "1045929 Ontario Limited"

Signed and Sealed this
Seventeenth Day of February, 2015

Michelle K. Lee
*Deputy Director of the United States Patent and Trademark Office*